United States Patent

Suzuki

[11] Patent Number: 6,125,671
[45] Date of Patent: Oct. 3, 2000

[54] STEERING LOCK SYSTEM

[75] Inventor: Noriyuki Suzuki, Aichi, Japan

[73] Assignee: Kabushiki Kaisha Tokai Rika Denki Seisakusho, Aichi, Japan

[21] Appl. No.: 08/967,899

[22] Filed: Nov. 12, 1997

[30] Foreign Application Priority Data

Nov. 13, 1996 [JP] Japan ............................... P.8-301868
Nov. 13, 1996 [JP] Japan ............................... P.8-301870

[51] Int. Cl.⁷ .................................................. B60R 25/02
[52] U.S. Cl. ........................................... 70/186; 70/252
[58] Field of Search ............................. 70/182–186, 252

[56] References Cited

U.S. PATENT DOCUMENTS

| | | | |
|---|---|---|---|
| 1,466,537 | 8/1923 | McCarthy | 70/252 X |
| 1,736,900 | 11/1929 | Carpenter | 70/185 |
| 2,890,581 | 6/1959 | Lewis | 70/185 |
| 2,964,935 | 12/1960 | Lombardi | 70/252 |
| 3,610,004 | 10/1971 | Neese | 70/186 X |
| 3,680,335 | 8/1972 | Onishi | 70/252 |
| 4,318,288 | 3/1982 | Rifat | 70/186 X |
| 4,643,009 | 2/1987 | Sato | 70/252 |
| 4,784,415 | 11/1988 | Malaval | 70/282 X |
| 4,907,427 | 3/1990 | Armstrong | 70/252 |
| 5,136,284 | 8/1992 | Kitamura | 70/252 X |
| 5,454,238 | 10/1995 | Ross et al. | 70/252 X |
| 5,634,358 | 6/1997 | Myers | 70/185 X |
| 5,685,183 | 11/1997 | Hattori et al. | 70/186 X |

FOREIGN PATENT DOCUMENTS

| | | | |
|---|---|---|---|
| 2615892 | 12/1988 | France | 70/252 |
| 3206434 A1 | 9/1983 | Germany . | |
| 3318415 | 8/1984 | Germany | 70/252 |
| 3344411 | 6/1985 | Germany | 70/252 |
| 463825 | 6/1951 | Italy | 70/185 |
| 175543 | 7/1989 | Japan | 70/252 |
| 144476 | 6/1920 | United Kingdom | 70/186 |
| WO 92/16395 | 10/1992 | WIPO . | |

*Primary Examiner*—Lloyd A. Gall
*Attorney, Agent, or Firm*—Morgan, Lewis & Bockius LLP

[57] ABSTRACT

An actuator 6 is separated from an operation section. The actuator 6 has a lock member 10 which locks or unlocks a steering shaft 7 and a lock control mechanism 15. The lock control mechanism 15 includes an actuation member which is provided so as to be movable back and forth in a predetermined direction; a second spring 14 which serves as a spring for unlocking purposes; and a lock stopper 13 provided in order to receive the spring force of the second spring 14. The actuation member 12 is actuated by a motor 16.

4 Claims, 9 Drawing Sheets

STEERING LOCK SYSTEM

BACKGROUND OF THE INVENTION

1. Field of the Invention

The present invention relates to a steering lock system in which an actuator section for locking or unlocking a steering shaft is separated from an operation section such as a key device.

2. Related Art

An existing steering lock system comprises a key section which is mechanically actuated in association with a lock mechanism of the steering shaft and is formed into an integral unit. With regard to the common structure of the steering lock system, a cam member which rotates together with a key rotor in an integrated manner extends to a lock mechanism between the key rotor and the lock mechanism of a steering shaft while remaining in a concentric position relative to the key rotor. In addition, a locking lever which is actuated in association with the insertion and removal of a key is interposed between the key rotor and the lock mechanism. When the key is turned from an "ACC" position to a "LOCK" position, the cam member is actuated. In response to the actuation of the cam member, the lock member provided in the lock mechanism of the steering shaft is also actuated so as to be able to lock the steering shaft. If the key is removed from the key rotor while the rotor is in the "LOCK" position, the locking lever is actuated, which in turn actuates the lock member so as to fit into the groove of the steering shaft, thereby locking the steering shaft.

The key is inserted into the key rotor while the rotor is in the "LOCK" position and is then turned to an operating position (e.g., "ACC," "ON," or "START" position), the cam member is actuated to thereby move the lock member to an unlock position.

However, with the foregoing configuration, the key section and the lock mechanism of the steering shaft are assembled as a unit to mechanically move in association with each other. If the key section is provided in an instrument panel in the vicinity of the driver's seat, the lock mechanism is positioned in front of the driver's knees. As a result, the strength or position of the lock mechanism may be limited.

To solve this problem, it is thought that an operation section, such as a key device, is separated from an actuator section of the lock mechanism, or the like. In this case, the lock member incorporated in the lock mechanism is moved to the lock position by means of a spring member. In a case where the key is inserted into the key rotor and turned to the "ACC" position (i.e., a case where the lock mechanism is unlocked), the turning action is detected, for example, by detection means. In accordance with a detection signal, drive means, such as a motor, is driven so as to move the lock member to the unlock position.

Here, if the lock member is engaged with the lock groove of the steering shaft or undergoes so-called handle torque, the degree of fitting of the lock member into the groove is increased. As a result, the lock member may not move toward the unlock position at all even if the motor is turned on. In such a case, the handle is slightly turned so as to eliminate the handle torque, and the motor is turned on again. In the end, the lock member may become disengaged from the lock groove. In this case, however, the motor locks at the beginning, which in turn results in labor for turning on the motor twice. A reduction in the useful life of the motor may also result.

Incidentally, there is a need for means for holding the lock member in the unlock position in order to prevent the lock member from inadvertently locking the steering shaft. Since the existing lock mechanism of the steering shaft is mechanically actuated in association with the key, the lock member is held in the unlock position by means of the cam member, so long as the key rotor is situated in a predetermined turn position.

In the case of the aforementioned lock mechanism, in which the operation section such as a key device is separated from the actuator section of the lock mechanism, means for holding the lock member in the unlock position must be newly provided for the actuator section, because the lock mechanism does not have any cam member. To this end, an unlock-status hold member is attached to electric drive means; e.g., a plunger of a solenoid, and an electric signal is produced by actuation of the operation section. The solenoid is actuated by the electrical signal, thereby holding the lock member in the unlock position by means of the unlock-status hold member.

In the case of such a configuration in which the unlock-status hold member is actuated by means of the electrical drive means such as a solenoid, fears arise as to operation failures due to electrical problems.

SUMMARY OF THE INVENTION

The present invention has been contrived in view of the foregoing problems in the art, and the object of the present invention is to provide a steering lock system which realizes a high degree of freedom of layout of an actuator section by separation of an operation section, such as a key device, from the actuator section; and which is capable of ensuring holding of a lock member in an unlock position without being affected by electrical problems while actuating an unlock-status hold member by means of electrical actuation means.

The present invention has been contrived in view of the foregoing problem in the art, and the object of the present invention is to provide a steering lock system which realizes a high degree of freedom of layout of an actuator section by separation of an operation section, such as a key device, from the actuator section; and which is capable of actuating a lock member without locking electric actuation means, or without a need of actuation of the electric actuation means a plurality of times, even if the lock member is an inactive state due to handle torque when the lock member is unlocked.

The present invention provides a steering lock system including an operation section such as a key device, and
an actuator section which is separated from the operation section and locks or unlocks a steering shaft in association with actuation of the operation section, wherein
the actuator section further comprises
  a lock member which is moved so as to be able to move between a position where the lock member locks the steering shaft and another position where the lock member unlocks the steering shaft;
  electric actuation means which is controlled in accordance with actuation of the operation section; and
  a lock control mechanism which has an actuation member to be moved back and forth by means of the electric actuation means and an unlock spring member for forcing the lock member toward an unlock position; the lock control mechanism causing the lock member to lock or unlock in accordance with the back-and-forth movement of the actuation member; and when the electric drive means is actuated so as to effect unlocking operation while the lock member undergoes handle torque, the lock control mechanism storing the spring force of the unlock spring while absorbing displacement of the actuation member.

In this configuration, the operation section, such as a key device, is separated from the actuator section, thereby resulting in an increase in the degree of freedom of layout of the actuator section. For example, the actuator section can be disposed around the driver's feet in the vicinity of the driver's seat, thereby resulting in an increase in the effective space.

The electric actuation means performs locking or unlocking operation in response to the actuation of the operation section, thereby moving the actuation member back and forth. The lock control mechanism causes the lock member to lock or unlock.

Particularly, in an ordinary case (where no handle torque is exerted on the lock member), the lock member is in a state in which it can be unlocked. Therefore, the lock member moves to the unlock position without a hitch. If handle torque is exerted on the lock member, the lock member cannot be unlocked. Even if the electric actuation means is actuated to perform unlocking operation in this state, the lock member may not be unlocked. At this time, fears arise as to the lock of the electric actuation means.

In the foregoing configuration, if the electric actuation means performs unlocking operation while there is handle torque, the displacement of the actuation member is absorbed by means of the unlock spring, and hence the electric actuation means is prevented from becoming locked. At this time, the spring force of the unlock spring member is accumulated, and the thus-accumulated spring force acts on the lock member, as well. Subsequently, if the handle torque is eliminated as a result of actuation of the steering handle by the driver, the lock member becomes movable. The lock member which undergoes the accumulated spring force of the unlock spring moves to the unlock position. In this way, the electric actuation means does not lock, and the lock member can be moved to the unlock position only by one actuation.

According to a second aspect of the present invention, the lock control mechanism is further characterized by comprising a second actuation member which can be moved back and forth by means of the electric actuation means in a direction which substantially crosses the direction of movement of the lock member; and a lock stopper which is provided so as to be able to move in the same direction in which the second actuation member travels; which is actuated as a result of receipt of the force to move the second actuation member in one direction via the unlock spring; which, as a result of actuation, moves the lock member to the unlock position; and which moves together with the second actuation member in an integral manner when the second actuation member is moved in another direction, to thereby move the lock member to a lock position, and wherein when the electric drive means is actuated so as to effect unlocking operation while the lock member undergoes handle torque, the displacement of the second actuation member is absorbed by the unlock spring, and the spring force is accumulated in the unlock spring.

In the foregoing construction, while there is handle torque, the lock member cannot move. Accordingly, even if the electric actuation means is actuated so as to perform unlocking operation, the lock stopper also cannot move. Further, the displacement of the actuation member is absorbed by the unlock spring, thereby preventing the electric actuation means from locking. At this time, the spring force of the unlock spring is accumulated, and the thus-accumulated spring force acts on the lock member, as well. Subsequently, if the handle torque is eliminated as a result of actuation of the steering handle by the driver, the lock member becomes movable. The lock member which undergoes the accumulated spring force of the unlock spring is actuated and moves the lock member to the unlock position. In this way, the electric actuation means does not lock, and the lock member can be moved to the unlock position only by one actuation.

Further, the actuation member can move in the direction substantially crossing the direction in which the lock member moves, and hence only small space is required in the direction in which the lock member moves.

According to a third aspect of the present invention, the lock control mechanism is further characterized by comprising:

a second actuation member which can be moved back and forth by means of the electric actuation means in the same direction in which the lock member is moved; and a spring receiving member which can move in the same direction in which the second actuation member moves, wherein the spring receiving member is provided in such a way that the unlock spring is interposed between the lock member and the spring receive member, and wherein the spring receiving member moves together with the lock member in an integral manner via the unlock spring when the second actuation member is moved in an unlock direction, and wherein when the electric drive means is actuated so as to effect unlocking operation while the lock member undergoes handle torque, the displacement of the spring receive member and the second actuation member is absorbed by the unlock spring, and the spring force is accumulated in the unlock spring.

In the foregoing construction, while there is handle torque, the lock member cannot move. Accordingly, even if the electric actuation means is actuated so as to perform unlocking operation, the displacement of the spring receiver and the actuation member is absorbed by the unlock spring, thereby preventing the electric actuation means from locking. At this time, the spring force of the unlock spring is accumulated, and the thus-accumulated spring force acts on the lock member, as well. Subsequently, if the handle torque is eliminated as a result of actuation of the steering handle by the driver, the lock member becomes movable. The lock member which undergoes the accumulated spring force of the unlock spring is actuated and moves the lock member to the unlock position. In this way, the electric actuation means does not lock, and the lock member can be moved to the unlock position only by one actuation.

Further, the actuation member can move in the same direction in which the lock member moves, and hence only small space is required in the direction crossing the direction in which the lock member moves.

The present invention provides a steering lock system including an operation section such as a key device, and an actuator section which is separated from the operation section and locks or unlocks a steering shaft in association with actuation of the operation section, wherein the actuator section further comprises a lock member which is moved so as to be able to move between a position where the lock member locks the steering shaft and another position where the lock member unlocks the steering shaft; and which is constantly forced toward the lock position by means of the lock spring and has an unlock-status hold engage section;

a release mechanism for moving the lock member to the unlock position;

electric actuation means which actuates the release mechanism;

an unlock-status hold member which engages the unlock-status hold engage section and holds the lock member in the unlock position by means of the spring force of an unlock spring member when the lock member arrives at the unlock position;

electric unlocking means which is controlled in accordance with the actuation of the operation section and actuates the unlock-status hold member in a disengage direction; and a disengage control member which prevents disengaging action of the unlock-status hold member when the lock member should be unlocked and allows the disengaging action of the unlock-status hold member when the lock member should be locked.

In this configuration, the operation section, such as a key device, is separated from the actuator section, thereby resulting in an increase in the degree of freedom of layout of the actuator section. For example, the actuator section can be disposed around the driver's feet in the vicinity of the driver's seat, thereby resulting in an increase in the effective space.

In a condition in which the lock member should be held in an unlocked state, the disengage control member prevents the disengaging action of the unlock-status hold member. In contrast, in a condition in which the lock member should be locked, the disengage control member allows the disengaging action of the unlock-status hold member. Accordingly, even if the electric unlocking means is actuated because of; e.g., electric problems, the unlock-status hold member is prevented from performing disengaging action. Therefore, the lock member can be prevented from becoming inadvertently unlocked.

BRIEF DESCRIPTION OF THE DRAWINGS

FIGS. 5(*a*) and 5(*b*) are schematic representations for explaining the operation of the steering lock system;

FIGS. 6(*a*) and 6(*b*) are schematic representations for explaining the operation of the steering lock system;

FIGS. 7(*a*) and 7(*b*) are schematic representations for explaining the operation of the steering lock system;

FIGS. 8(*a*) and 8(*b*) are schematic representations for explaining the operation of the steering lock system;

DETAILED DESCRIPTION OF THE PREFERRED EMBODIMENTS

By reference to FIGS. 1 through 9, a first embodiment of the present invention will be described. First, as shown in FIG. 4, a key device 1 is incorporated in an instrument panel of a vehicle. The key device 1 comprises a key rotor 3 encased in a key case 2 and a key insert hole 4 formed in the key rotor 3. The key rotor 3 allows the insertion or removal of a key into or from the key insert hole 4 at a position "LOCK." The key is turned to the positions "ACC," "ON," and "START" in order from the position "LOCK." The removal of the key is not allowed at these operating positions. The key device 1 has key insert/removal detection means 5*a* (see FIG. 9) for detecting the insertion and removal of the key; a key code read/check device 5*b* (see FIG. 9) for reading and checking an electrical code stored in the key; and key turn-position detection means 5*c* for detecting the turn position of the key.

The key insert/removal detection means 5*a* outputs a key insert detection signal Kin when the key is inserted into the key rotor 3 and outputs a key removal detection signal Kout when the key is removed from the same. The thus-output signal is delivered to a lock control circuit 24 which will be described later. The key code read/check device 5*b* determines whether or not the inserted key is valid. If the key is valid, a valid key determination signal K is output. In contrast, if the key is invalid, an invalid key determination signal NG is output. The key turn-position detection means 5*c* outputs an "ACC" position detection signal Kacc when the key is turned past the "ACC" position. In contrast, if the key is turned from the "LOCK" position to the "ACC" position, a "LOCK" position detection signal Klock is output. An operation section 5 is constituted from the key device 1, the key insert/removal detection means 5*a*, the key code read/check device 5*b*, and the key turn-position detection means 5*c*.

Figure 1:
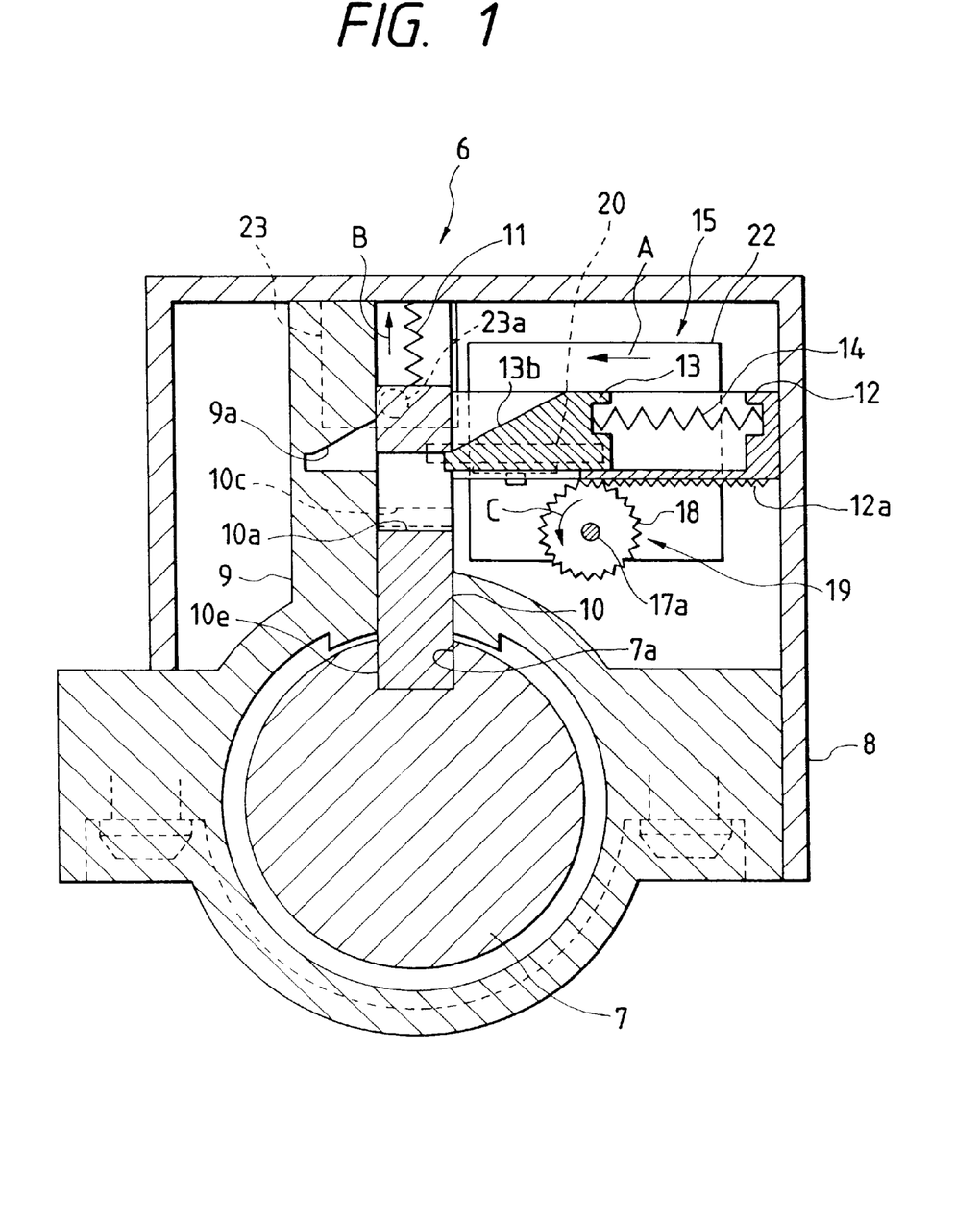
FIG. 1 is a longitudinal front view showing an actuator in accordance with a first embodiment of the present invention when viewed in the axial direction of a steering shaft.
Figure 2:
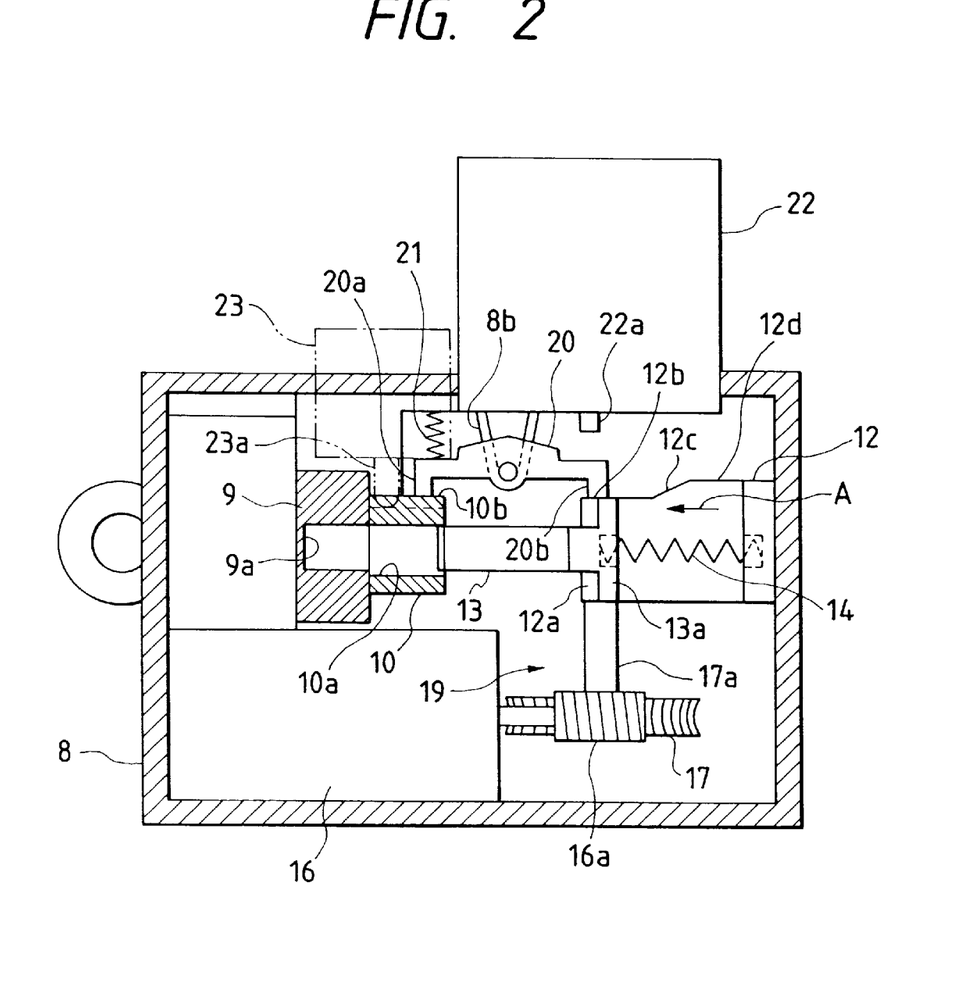
FIG. 2 is a lateral plan view showing the actuator.
Figure 3:
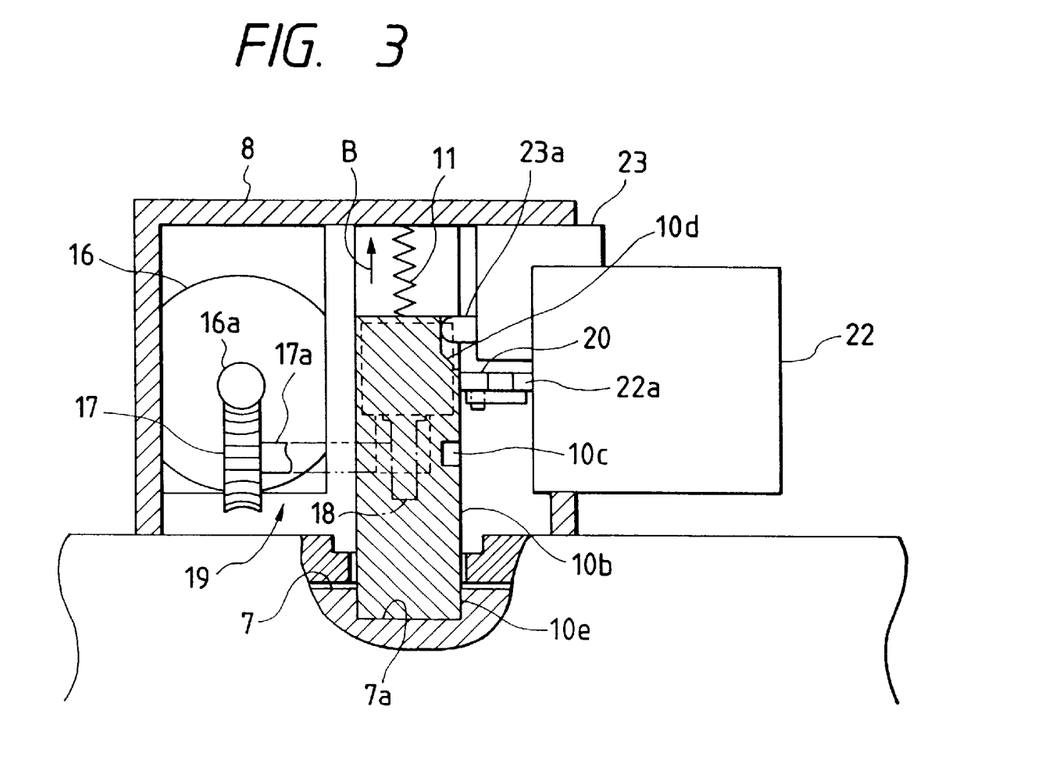
FIG. 3 is a longitudinal cross-sectional view showing the actuator.
Figure 4:
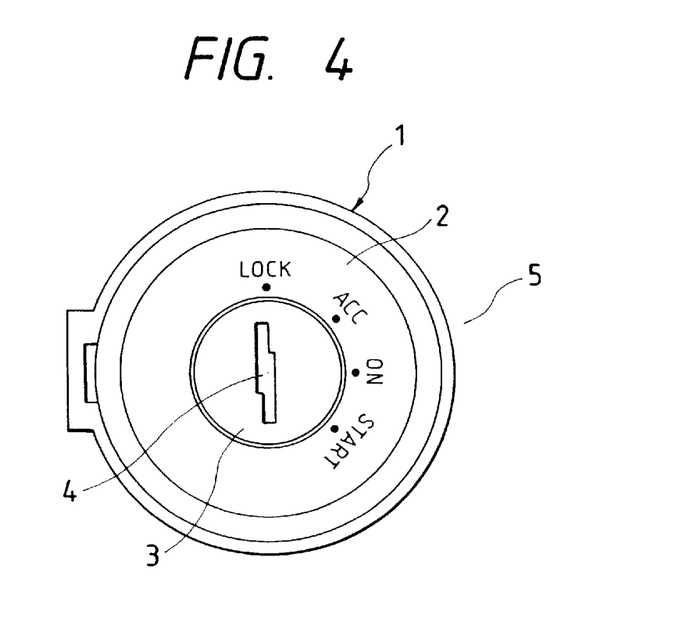
FIG. 4 is a plan view showing a part of the actuator.

FIGS. 1 through 3 illustrate an actuator section 6 which is separated from the operation section 5 and is disposed in a required position in the vicinity of a steering shaft 7. An explanation will be given of this actuator section 6. A bracket 8 is provided outside and around the steering shaft 7. A substantially-prism-shaped lock member 10 is provided in a guide section 9 of the bracket 8 so as to be vertically movable in FIG. 1. The lower end 10*e* of the lock member 10 engages a lock groove 7*a* of the steering shaft 7 to thereby cause steering lock. The lower end 10*e* is actuated between a lock position where it engages the lock groove 7*a* and an unlock position where it disengages from the lock groove 7*a*.

The lock member 10 is constantly forced toward the lock position where it locks the steering shaft 7 by means of a first spring 11; e.g., a compression spring, which is provided as a lock spring and is in contact with the upper end of the lock member 10. As shown in FIG. 1, a stopper hole 10*a* is formed so as to pass through the lock member 10 in a transverse direction of the lock member 10. Further, as shown in FIG. 3, a retaining groove 10*c* which serves as an unlock-status hold engage section is formed in a side surface 10*b* of the stopper hole 10*a*.

In the position opposite to the stopper hole 10*a*, an actuation member 12 is disposed so as to be movable back and forth in the direction designated by arrow A and in the opposite direction (i.e., in the direction substantially crossing the direction in which the lock member 10 is moved). A rack 12a is formed on the lower surface of the actuation member 12. The actuation member 12 is provided with a lock stopper 13. This lock stopper 13 is connected to a second spring 14 which comprises a compression coil spring serving as an unlock spring in such a way as to be able to move in the direction designated by arrow A. More specifically, the lock stopper 13 is moved in the direction opposite to the direction A as a result of an engage section 12a (see FIG. 2) engaging a mating section 13a of the lock stopper 13 when the actuation member 12 moves in the direction opposite to the direction A.

A tapered cam surface 13b is formed in the end of the lock stopper 13 facing the lock member. The front end of the cam surface 13b is constantly inserted into the stopper hole 10a of the lock member 10. In this case, as shown in FIG. 2, the side surface 12b of the actuation member 12 is substantially flush with the side surface 10b of the lock member 10. A tapered surface 12c and a plane surface 12d which is continually connected to an upper end of the tapered surface 12C is continually formed after the side surface 12b.

The second spring 14 has stronger spring force than that of the first spring 11. Accordingly, if the actuation member 12 is moved in the direction designated by arrow A; i.e., one of the directions in which the actuation member 12 is actuated, the lock stopper 13 that undergoes the spring force of the second spring 14 moves the lock member 10 in a direction designated by arrow B against the spring force of the first spring member 11. The actuation member 12, the lock stopper 13, and the second spring 14 form a lock control mechanism 15. In this case, the actuation member 12 doubles as a disengage control member. A recess 9a for receiving the front end of the cam surface 13b of the lock stopper 13 is formed in the guide section 9.

The bracket 8 is provided with a motor 16 which serves as electric actuation means and is made up of; e.g., a pulse motor. A worm gear 16a is attached to the rotary shaft of the motor 16. A worm wheel 17 is attached so as to mesh with the worm gear 16a. A pinion gear 18 which meshes with the rack 12a is attached to the end of a shaft 17a of the worm wheel 17. A gear mechanism 19 is formed from these elements. When the motor 16 is forwardly rotated, the actuation member 12 is moved in the direction designated by arrow A via the gear mechanism 19. In contrast, when the motor 16 is rotated in the direction opposite to the direction A, the actuation member 12 is moved in that direction.

In contrast, as shown in FIG. 2, the lock member 10 has the side surface 10b on which the retaining groove 10c is formed and an unlock-status hold member 20 which extends across the side surface 12b of the actuation member 12. The center of the shaft of the unlock-status hold member 20 is pivotally supported by a shaft hold section 8b having a substantially U-shaped form. A spring member 21 is attached to one end 20a of the unlock status hold member 20. The spring member 21 comprises; e.g., a compression spring which serves as an unlock-status hold member and forces the end 20a toward the side surface 10b. When the actuation member 12 is moved in the direction designated by arrow A from the position shown in FIG. 2, the other end 20b of the unlock-status hold member 20 is relatively slid over the plane surface 12d from the side surface 12b of the actuation member 12 via the tapered surface 12c. Further, when the lock member 10 is moved in the direction designated by arrow B from the position shown in FIGS. 1 and 2, the end 20a of the unlock-status hold member 20 fits into and engages the retaining groove 10c.

A solenoid 22 which serves as electric unlocking means for pressing the end 20b toward the side 12b is provided on the end 20b of the unlock-status hold member 20. A plunger 22a is positioned so as to be opposite to the end 20b of the unlock-status hold member 20. An unlocking action detection switch 23 is provided in such a way that an actuator 23a is positioned in the vicinity of a notch 10d of the lock member 10. The unlocking action detection switch 23 is made up of a limit switch which serves as unlock-status detection means. In the state shown in FIG. 3, the unlock-status detection switch 23 is in an off state. When the lock member 10 is moved in the direction designated by arrow B, the unlock-status detection switch 23 is turned on. Upon detection of the turn-on action of the lock member 10, the unlock-status detection switch 23 outputs an unlock detection signal Lout (see FIG. 9). In contrast, upon detection of the turn-off action of the lock member 10, the unlock-status detection switch 23 outputs a lock detection signal Lon.

The lock control circuit 24 which serves as lock control means receives the valid key determination signal K from the operation section 5, the key insertion detection signal Kin, the key removal detection signal Kout, the foregoing unlock detection signal Lout, or the lock detection signal Lon. Further the lock control circuit 24 is designed so as to control the motor 16 and the solenoid 22 in accordance with the thus-received signals. A display 25 is provided in the instrument panel (not shown) in order to indicate handle torque if the handle torque is exerted on the lock member 10. The display 25 is also controlled by the lock control circuit 24.

Figures 5A, 5B:
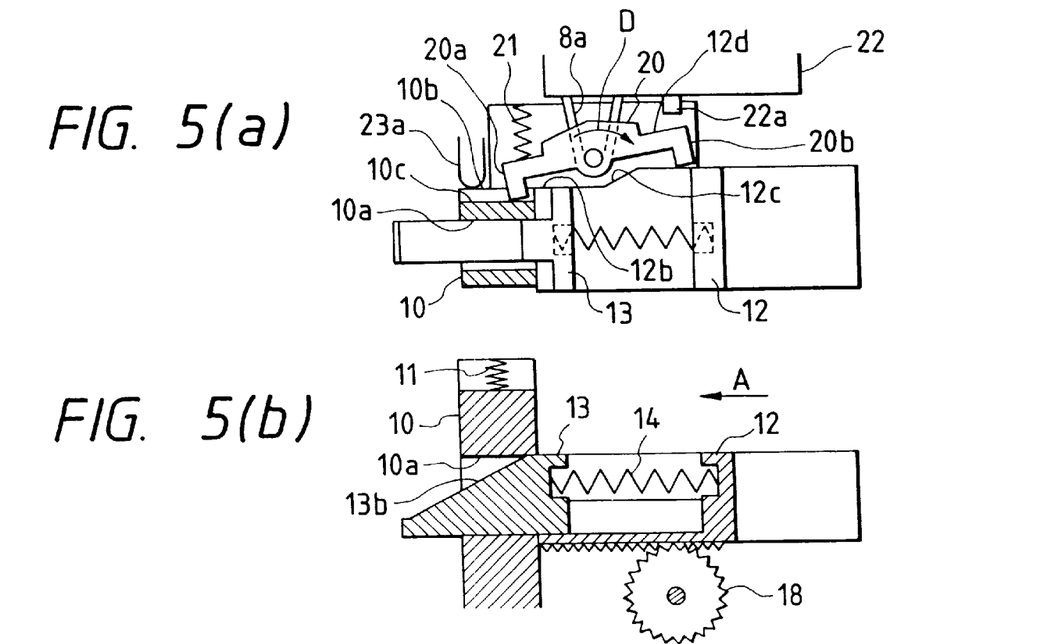
Figures 6A, 6B:
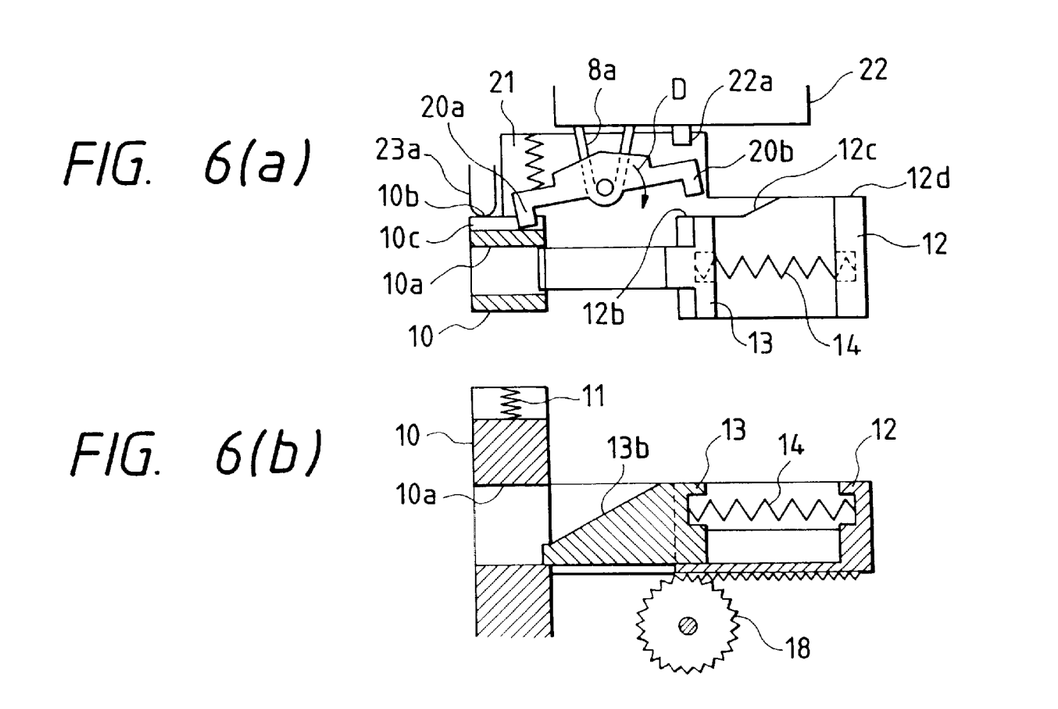
Figure 7A:
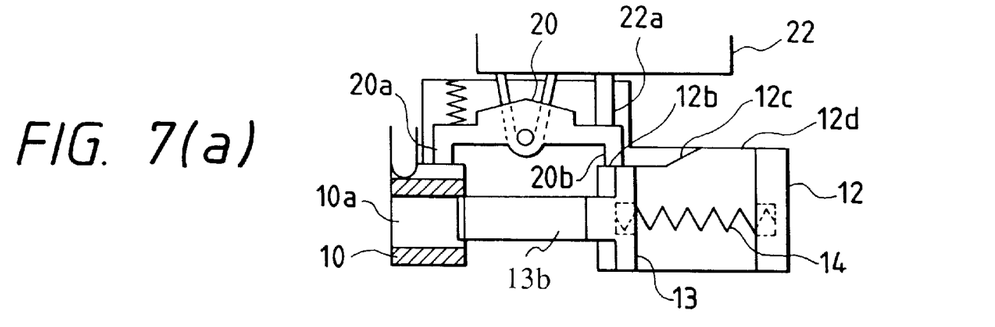
Figure 7B:
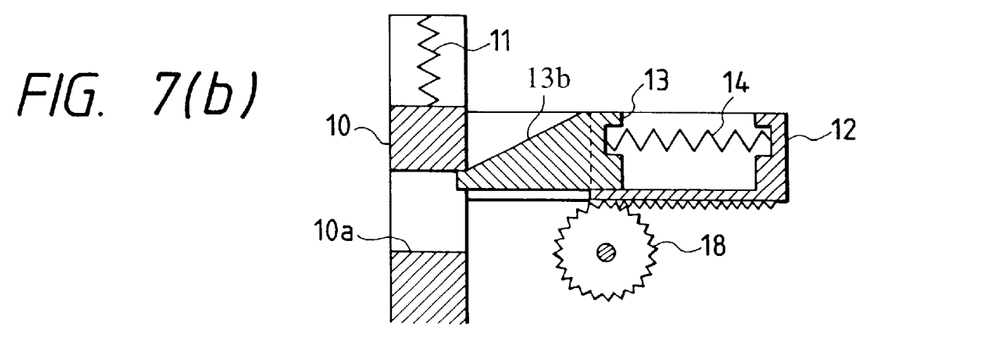

By reference to FIGS. 5 through 8, the operation of the foregoing steering lock system will be described. FIG. 5(a) is a plan view showing the principal elements of the steering lock system, and FIG. 5(b) is a front view showing the principal elements shown in FIG. 5(a). Initially, FIGS. 1 through 3 illustrate the state of each of the principal elements when the key is not inserted into the steering lock system. More specifically, the lower end 10e of the lock member 10 is held in the lock position where the lock member engages and fits into the lock groove 7a of the steering shaft 7.

When the key is inserted into the key rotor 3, the key insertion detection signal Kin is delivered to the lock control circuit 24. If the key is valid, the valid key determination signal K is delivered to the lock control circuit 24. When the key is turned past the "ACC" position, the "ACC" position detection signal Kacc is delivered to the lock control circuit 24. Upon receipt of these signals, the lock control circuit 24 forwardly rotates the motor 16 by application of a given number of pulses. The pinion gear 18 is rotated in the direction designated by arrow C, so that the actuation member 12 is moved in the direction designated by arrow A. As a result of movement of the actuation member 12, the lock stopper 13 is also moved in the same direction via the second spring member 14. The cam surface 13b of the lock stopper 13 forcefully raises the lock member 10 in the direction designated by arrow B against the spring force of the first spring 11. Accordingly, the lower end 10e of the lock member 10 is removed from the lock groove 7a of the steering shaft 7, and the lock member 10 arrives at the unlock position (see FIGS. 5(a) and 5(b)).

In association with the movement of the lock member 10 in the direction designated by arrow B, the retaining groove 10c and the notch 10d of the lock member 10 are moved. As a result, the end 20a of the unlock-status hold member 20 engages and fits into the retaining groove 10c by means of the spring force of the spring 21, thereby holding the lock member 10 in the unlock position. Further, the other end 20b of the unlock-status hold member 20 arrives as the plane surface 12d via the tapered surface 12c of the actuation member 12. At the same time, the actuator 23a of the unlock detection switch 23 is moved to the side surface 10b from the notch 10d, so that the unlock detection switch 23 is turned on. The unlock detection signal Lout is then output. In short, in a case where the lock member 10 is normally unlocked, the motor 16 is driven (i.e., the key is inserted into the key rotor 3), and the unlock detection signal Lout is output after lapse of a given period of time.

The lock control circuit 24 commences counting time after having received the "ACC" position detection signal Kacc. If the lock control circuit 24 receives the unlock detection signal Lout within a given period of time, the lock control circuit 24 determines that the lock member 10 is normally unlocked (i.e., there is no handle torque). In this case, an indication "Release Handle Torque" is not displayed on the display 25.

If the key is turned from the "ACC" position to the "LOCK" position in order to remove the key, the lock control circuit 24 receives the "LOCK" position detection signal Klock. Upon receipt of this signal, the lock control circuit 24 reversely rotates the motor 16 from its position shown in FIG. 5(a) and 5(b). As a result, the actuation member 12 is moved in the direction opposite to the direction designated by arrow A. In association with the movement of the actuation member 12, the lock stopper 13 is also moved in the same direction, whereby the majority of the lock stopper 13 is removed from the stopper hole 10a. This state is provided in FIG. 6(a) and 6(b). However, in this case, the end 20a of the unlock-status hold member 20 still remains engaged with the retaining groove 10c, and hence the lock member 10 is still held in the unlock position. The plane surface 12d of the actuation member 12 recedes with respect to the end 20b of the unlock-status hold member 20. As a result, the side surface 12b becomes separated from the end 20b. In other words, the unlock-status hold member 20 is allowed to pivot in a direction designated by arrow D.

When the key is removed from the key rotor 3 at the "LOCK" position, the key removal detection signal Kout is sent to the lock control circuit 24. Upon receipt of the signal, the lock control circuit 24 actuates the solenoid 22 in the position shown in FIG. 6 so as to protrude the plunger 22a. In this case, the unlock-status hold member 20 is allowed to pivot in the direction designated by arrow D, and therefore the end 20a of the unlock-status hold member 20 is pushed to pivot in the direction designated by arrow D. The end 20a is removed and disengaged from the retaining groove 10c, whereby the lock member 10 moves to the lock position by means of the spring force of the first spring member 11. The lock member 10 then fits into and engages the lock groove 7a of the steering shaft 7 (see FIGS. 7(a) and 7(b)). Concurrently, the actuator 23a of the microswitch 23 engages the notch 10d, so that the microswitch 23 is turned off. The lock detection signal Lon is output and delivered to the lock control circuit 24. Upon detection of this signal, the lock control circuit 24 returns to its initial state.

Figure 8A:
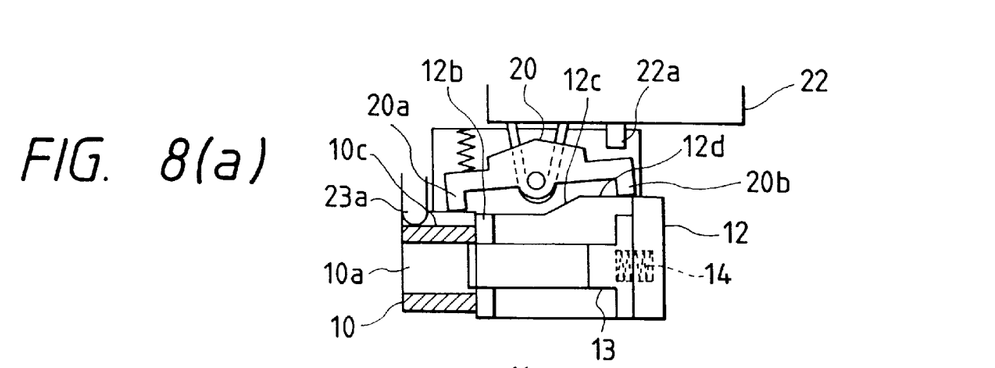

An explanation will now be given of a case where the lock member 10 undergoes handle torque when the key inserted at the "LOCK" position is turned to the "ACC" position. When the key is inserted into the key rotor 3 in the state shown in FIGS. 1 through 3, the key insert detection signal Kin and the valid key determination signal K are output to the lock control circuit 24. When the key is turned past the "ACC" position, and the "ACC" position detection signal Kacc is delivered to the lock control circuit 24, the lock control circuit 24 forwardly rotates the motor 16 by application of a given number of pulses. As a result, the pinion gear 18 is rotated in the direction designated by arrow C, and the actuation member 12 is moved in the direction designated by arrow A. At this time, since the lock member 10 undergoes handle torque, the lock stopper 13 cannot move. As shown in FIGS. 8(a) and (b), only the actuation member 12 moves against the spring force of the second spring 14. In short, the displacement of the actuation member 12 is absorbed by the second spring 14, and the spring force of the second spring 14 is accumulated at this time.

Figure 8B:
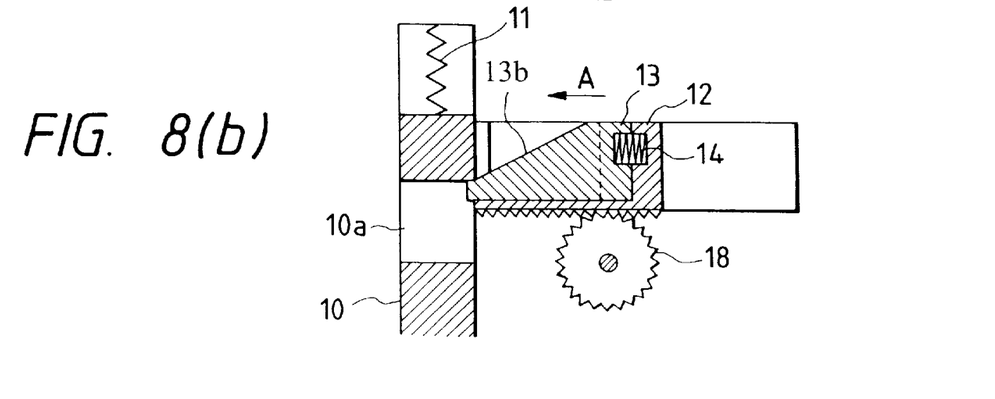
Figure 9:
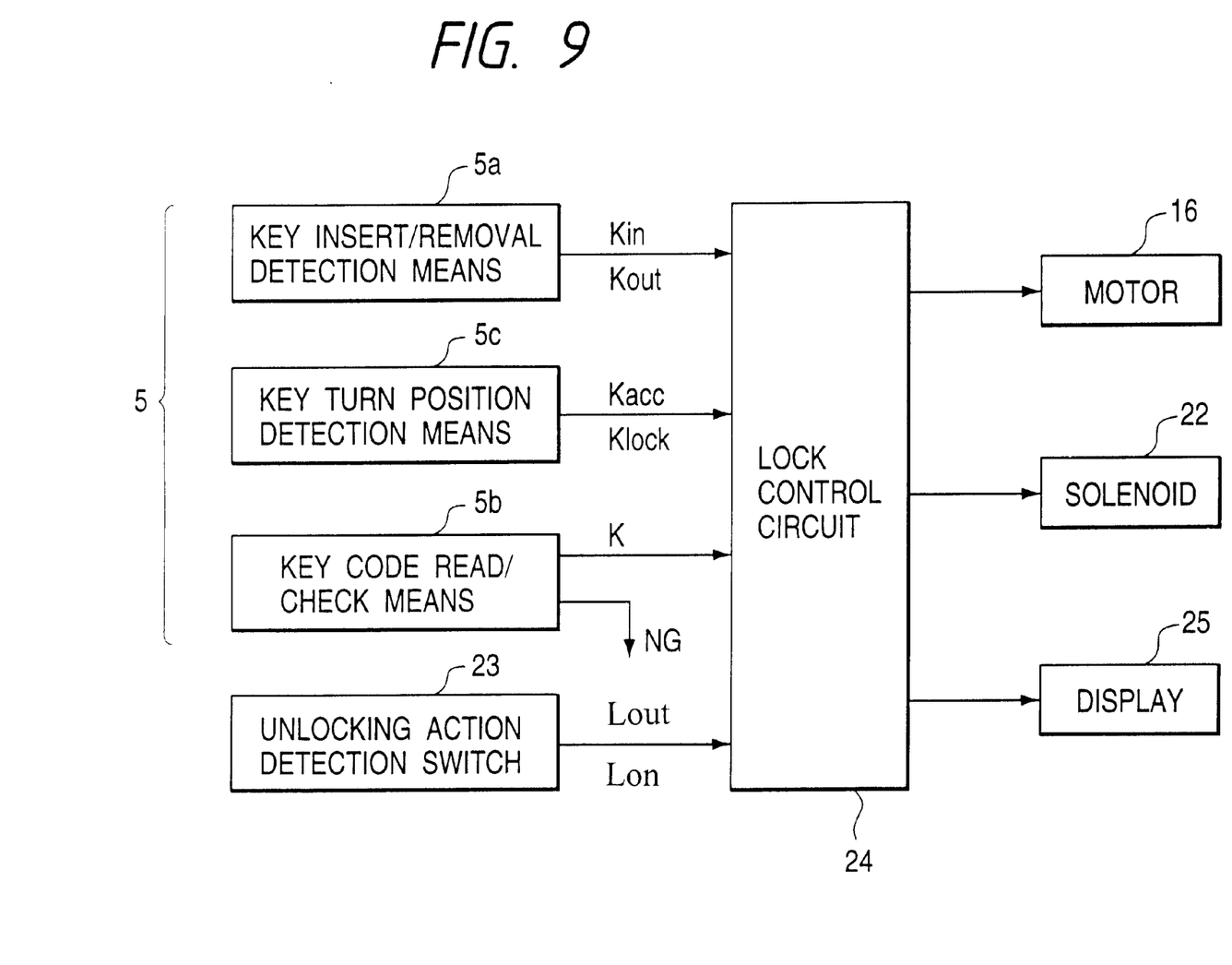
FIG. 9 is a block diagram showing an electric configuration.

Upon receipt of the "ACC" position detection signal Kacc, the lock control circuit 24 commences counting time. If the lock control circuit 24 fails to receive the unlock detection signal Lout from the unlock detection switch 23 within a given period of time, the lock control circuit 24 determines that the lock member 10 undergoes handle torque. Accordingly, the indication "Release Handle Torque" is displayed on the display 25. Subsequently, when the driver releases the handle torque by turning the steering handle to a required extent, the lock member 10 becomes movable. The lock stopper 13 that undergoes the accumulated spring force of the second spring 14 is moved in the direction designated by arrow A, and the lock member 10 is raised against the spring force of the first spring member 11. As a result, the lock member 10 is moved to the unlock position.

In a state shown in FIGS. 5(a) and 5(b); i.e., a state where the lock member should be held in the unlock position, if the solenoid 22 is turned on as a result of electrical troubles; e.g., a short circuit or switch failures, the plunger 22a presses the end 20b of the unlock-status hold member 20. However, in the state shown in FIG. 5, since the end 20b is in contact with the plane surface 12d of the actuation member 12, the unlock-status hold member 20 is prevented from pivoting in the direction designated by arrow D. In the end, the end 20a of the unlock-status hold member 20 is prevented from escaping from the retaining groove 10c. Thus, the lock member 10 is held in the unlock position.

As previously mentioned, in the present embodiment, the operation section 5, such as a key device, is separated from the actuator section 6, thereby resulting in an increase in the degree of freedom of layout of the actuator section 6. For example, the actuator section 6 can be disposed around the driver's feet in the vicinity of the driver's seat, thereby resulting in an increase in the effective space. In addition, the strength of the actuator 6 can also be increased.

Further, in the present embodiment, in a case where the lock member 10 should be held in the unlock position, the actuation member 12 that doubles as the disengage control member prevents the disengaging action of the unlock-status hold member 20. In contrast, in a case where the lock member 10 should be locked, the actuation member 12 allows the disengaging action of the unlock-status hold member 20. Accordingly, in the state where the lock member 10 should be locked, if the solenoid 22 that is the electric unlocking means is turned on, the unlock-status hold member 20 can be moved in a disengage direction without a hitch. If the solenoid 22 is actuated as a result of; e.g., electrical problems, in the case where the lock member 10 should be held in the unlock position, the disengaging action of the unlock-status hold member 20 is prevented, thereby ensuring prevention of inadvertent unlocking of the lock member 10.

Further, in the present embodiment, if the motor 16 is actuated so as to perform unlocking operation, the displacement of the actuation member 12 is absorbed by the second spring 14, thereby preventing the motor 16 from locking. At this time, the spring force of the second spring 14 is accumulated, and the thus-accumulated spring force also acts on the lock member 10 via the lock stopper 13. Subsequently, if the handle torque is eliminated as a result of actuation of the steering handle by the driver, the lock member 10 moves to the unlock position. In this way, the motor 16 does not lock, and the lock member 10 can be moved to the unlock position only by one actuation.

Further, the actuation member 12 can move in the direction substantially crossing the direction in which the lock member 10 moves, and hence only small space is required in the direction in which the lock member 10 moves. Accordingly, the lock member can be reduced in size in the vertical direction shown in FIG. 1.

Figure 10:
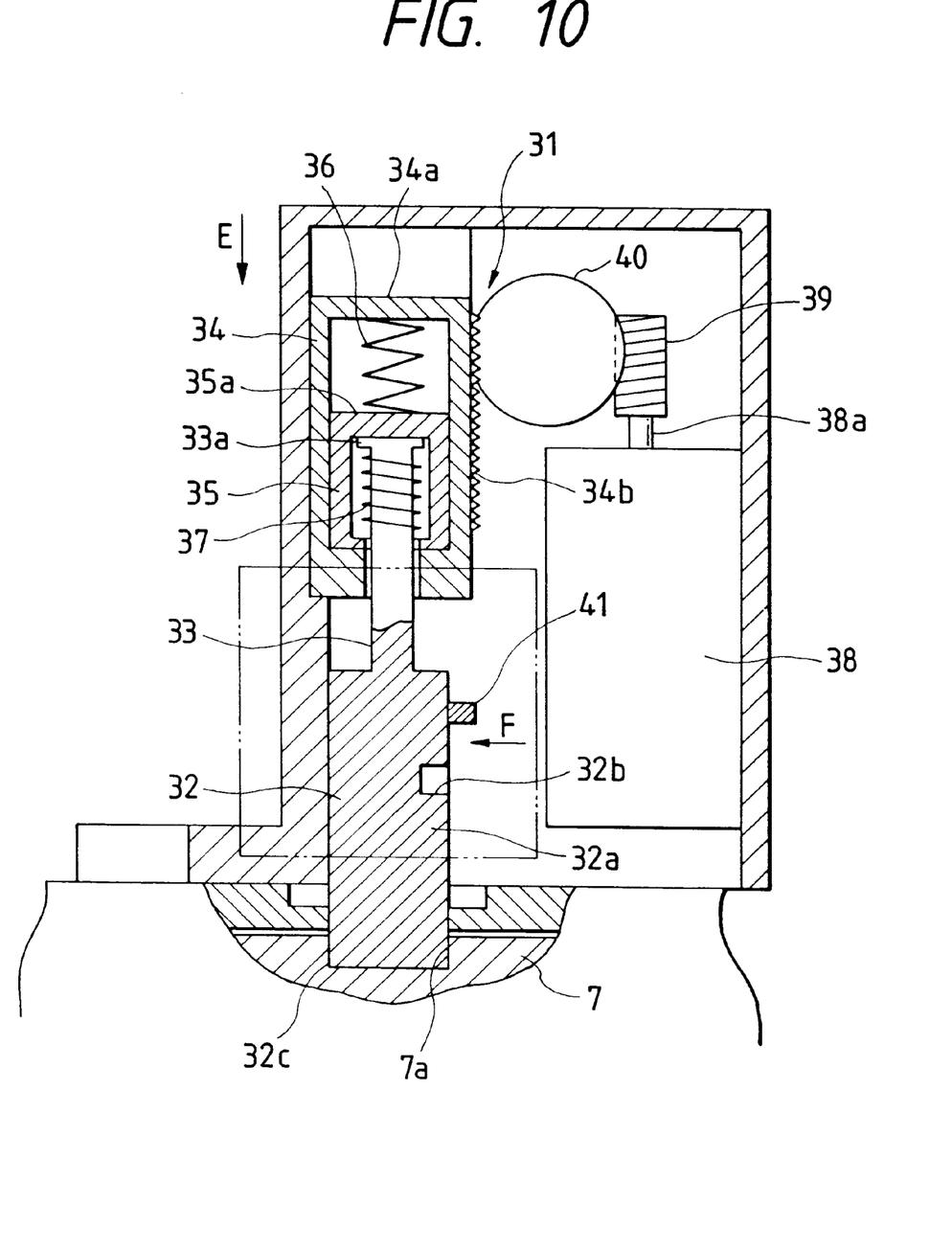
FIG. 10 is a schematic side elevation view showing an actuator in accordance with a second aspect of the present invention.
Figure 11:
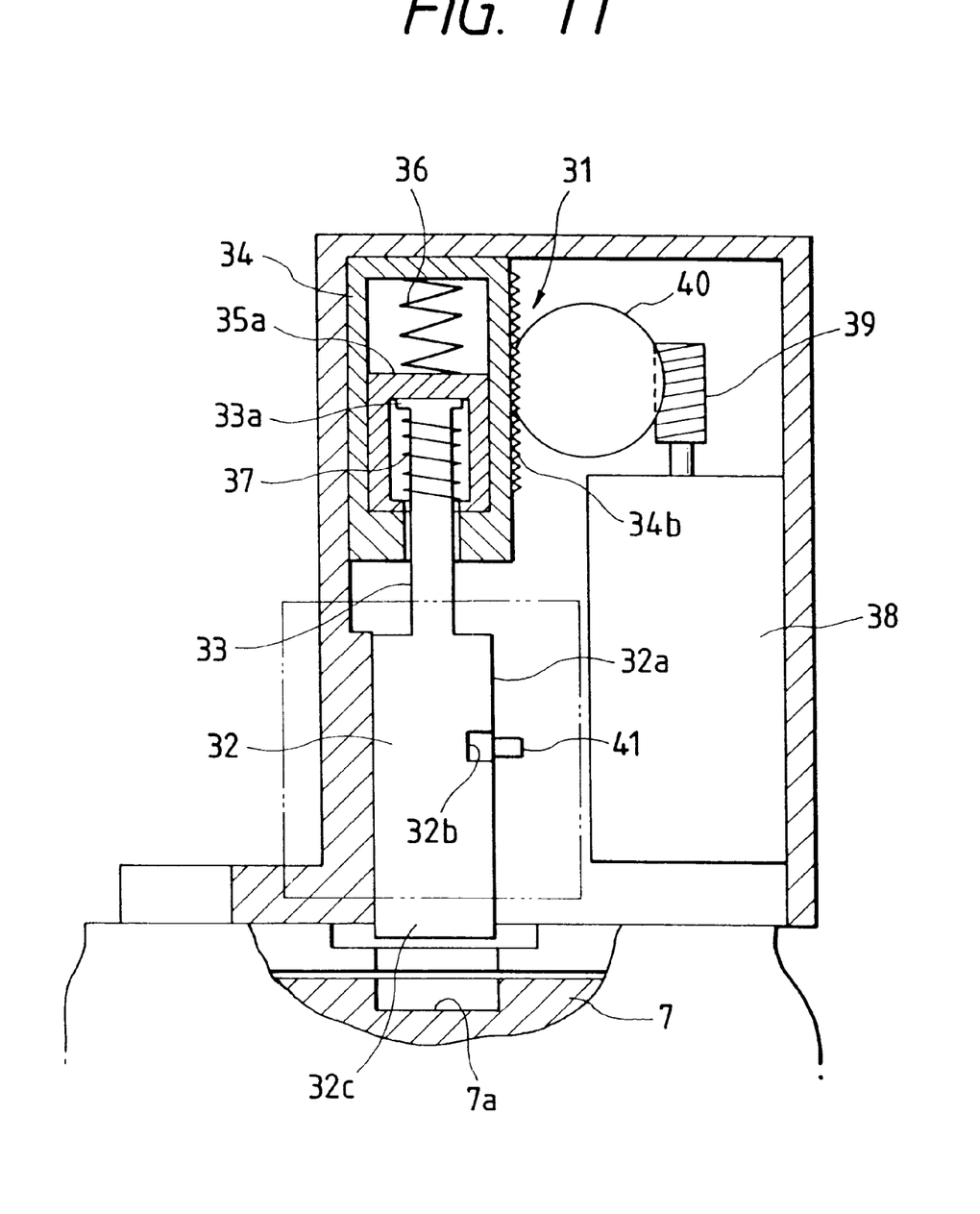
FIG. 11 is a schematic representation for explaining the operation of the steering lock system.
Figure 12:
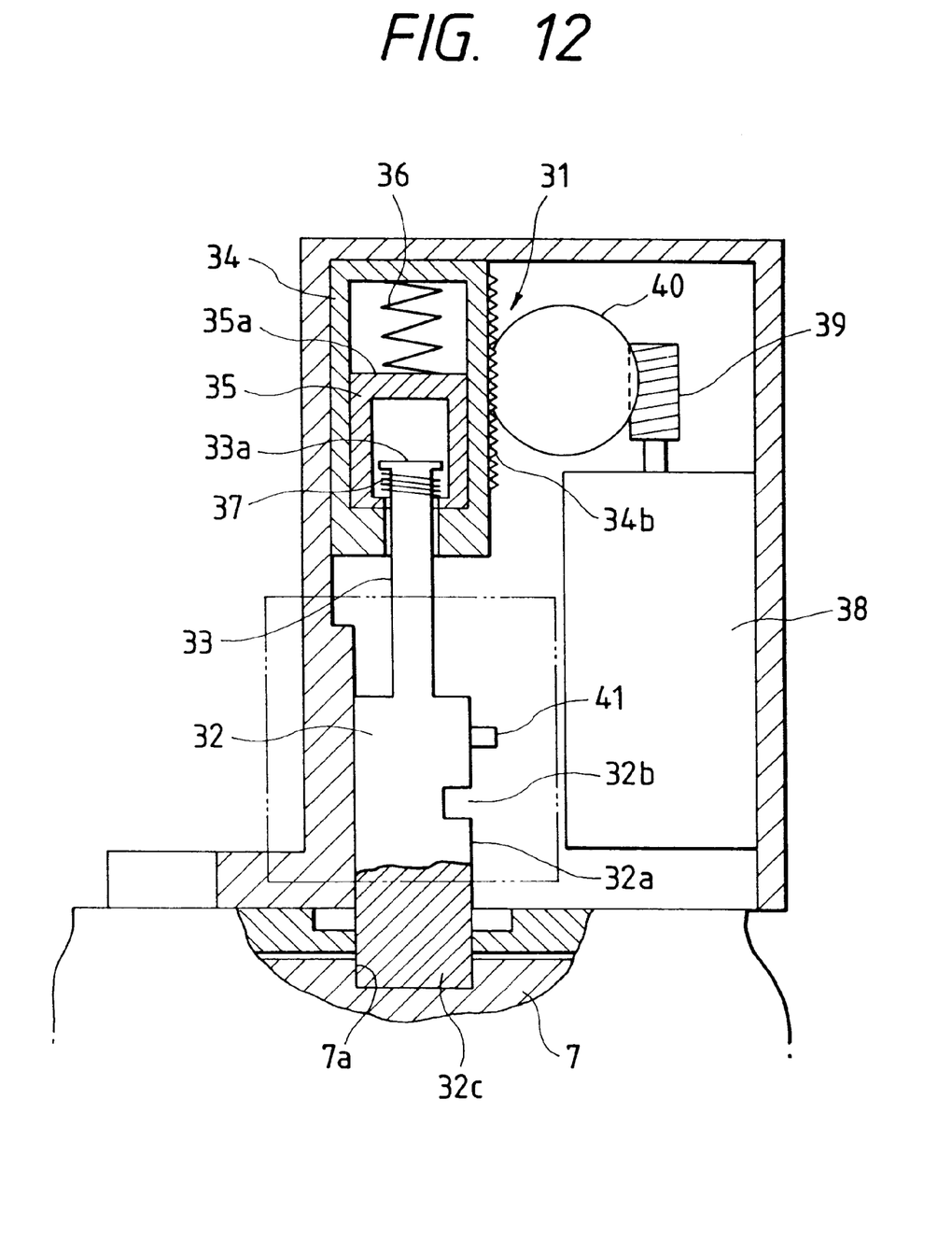
FIG. 12 is a schematic representation for explaining the operation of the steering lock system.

FIGS. 10 through 12 show a second embodiment of the present invention. The second embodiment is different from the first embodiment with regard to the structure of a lock control mechanism 31.

A retaining groove 32b is formed on a side surface 32a of a lock member 32 which engages the lock groove 7a of the steering shaft 7. A rod 33 having a narrow width protrudes from an upper portion of the lock member 32, and a removal stopper 33a having a wide width is formed at the upper end of the rod 33. A frame-shaped actuation member 34 is attached to the rod 33 in such a way as to be movable back and forth in the same direction in which the lock member 32 moves. A spring receiver 35 is attached to the rod 33 within the actuation member 34 so as to be movable in the same direction in which the actuation member 34 moves. A first spring 36 comprising; e.g., a compression coil spring, is sandwiched between the upper end 34a and an upper wall 35a of the spring receiver 35. The lock member 32 is forced toward the lock position (i.e., in a direction designated by arrow E) by means of the spring member 36.

A second spring 37 which serves as an unlock spring and comprises; e.g., a compression spring, is interposed between the removal stopper 33a and the lower wall of the spring receiver 35 for forcing the spring receiver 35 toward the direction designated by arrow E. The second spring 37 constantly holds the spring receiver 35 in contact with the removal stopper 33a of the rod 33 (i.e., in the limits of extent within the actuation member 34 to which the spring receiver 35 is moved in the direction designated by arrow E). The spring force of the second spring 37 is stronger than that of the first spring 36.

In contrast, a gear 34b is formed in the side surface of the actuation member 34. A gear 39 is attached to a rotary shaft 38a of a motor 38 which serves as electric actuation means. A gear 40 is interposed between the gear 39 and the gear 34b of the actuation member 34 so as to mesh with each other. Accordingly, as a result of rotation of the motor 38, the actuation member 34 is moved in the direction opposite to the direction designated by arrow E. In contrast, if the motor 38 is reversely rotated, the actuation member 34 is moved in the direction designated by arrow E.

An unlock-status hold member 41 is provided so as to be movable in a direction designated by arrow F and in the direction opposite to the direction F. The unlock-status hold member 41 is connected to the key device 1 by way of a control wire (not shown). If the lock member 32 arrives at the unlock position (see FIG. 11), and the key is turned to the "ON" position from the "ACC" position, the unlock-status hold member 41 is actuated in the direction designated by arrow F, to thereby engage the retaining groove 32b. Even in the second embodiment, the steering lock system is provided with a lock control circuit (not shown).

In the state shown in FIG. 10, the key is not inserted into the key rotor 3. More specifically, a lower end 32c of the lock member 32 is in the lock position where it fits into and engages the lock groove 7a of the steering shaft 7. Further, the unlock-status hold member 41 is in close proximity to the side surface 32a of the lock member 32.

If the key is inserted into the key rotor 3 in this state, the key insert detection signal Kin and the valid key determination signal K are delivered to the lock control circuit. If the key is turned past the "ACC" position, the "ACC" position detection signal Kacc is delivered to the lock control circuit. Upon receipt of these signals, the lock control circuit forwardly rotates the motor 38 by application of a given number of pulses. As a result, the actuation member 34 is moved in the direction opposite to the direction designated by arrow E by way of the gears 39, 40, and 34b. In association with the movement of the actuation member 34, the spring receiver 35 and the lock member 32 are moved in the same direction via the second spring 37. As a result, the lower end 32c of the lock member 32 disengages from the lock groove 7a of the steering shaft 7, and the lock member 32 arrives at the unlock position (see FIG. 11).

Concurrently, as shown in FIG. 11, the retaining groove 32b of the lock member 32 is positioned opposite the unlock-status hold member 41 (before the member 41 engages the groove 32b). If the key rotor 3 is turned from the "ACC" position to the "ON" position as a result of turning action of the key in this state, the unlock-status hold member 41 is moved in the direction designated by arrow F and fits into and engages the retaining groove 32b of the lock member 32. Consequently, the lock member 32 is held in the unlock state.

When the motor 38 is reversely rotated from in the state shown in FIG. 11, the actuation member 34 is moved in the direction designated by arrow E. However, the unlock-status hold member 41 remains engaged with the retaining groove 32b, and therefore neither the lock member 32 nor the spring receiver 35 moves. The spring force of the spring 36 is accumulated. In association with the movement of the unlock-status hold member 41 in the direction opposite to the direction designated by arrow F, the lock member 32 engages the lock groove 7a of the steering shaft 7 by means of the spring force of the spring 36 in the manner as shown in FIG. 10.

In the state where there is handle torque, the lock member 32 cannot move. If the motor 38 is actuated so as to perform unlocking operation (i.e., rotated in a forward direction) in this state, the lock member 32 still remains stationary. However, the spring receiver 35 and the actuation member 34 move against the spring force of the second spring 37. In other words, the displacement of the spring receiver 35 and the actuation member 34 is absorbed by means of the second spring 37, and hence the motor 38 is prevented from locking. At this time, the spring force of the second spring 37 is accumulated, and the thus-accumulated force acts on the lock member 32, as well (see FIG. 12). Subsequently, if the handle torque is eliminated by the driver, the lock member 32 becomes movable. The lock member 32 that undergoes the accumulated spring force of the second spring 37 is moved to the unlock position. As mentioned above, even in the second embodiment, the motor 38 is prevented from locking, and the lock member 32 can be moved to the unlock position only by one operation.

Further, in the second embodiment, since the actuation member 34 can move in the same direction in which the lock member 32 moves, only small space is required in the direction in which the lock member 32 moves.

In accordance with the first aspect of the present invention, the operation section, such as a key device, is separated from the actuator section, thereby resulting in an increase in the degree of freedom of layout of the actuator section. For example, the actuator section can be disposed around the driver's feet in the vicinity of the driver's seat, thereby resulting in an increase in the effective space. Further, it is ensured that the lock member can be held in an unlock position without being affected by electrical problems while an unlock-status hold member is actuated by means of electrical actuation means.

As is evident from the foregoing descriptions, the present invention provides the following advantageous results.

According to a first aspect of the present invention, an operation section, such as a key device, is separated from the actuator section, thereby resulting in a high degree of freedom of layout of an actuator section. For example, the actuator section can be disposed around the driver's feet in the vicinity of the driver's seat, thereby resulting in an increase in the effective space. Further, a lock member can be actuated without locking electric actuation means, or without a need of actuation of the electric actuation means a plurality of times, even if the lock member is an inactive state due to handle torque when the lock member is unlocked.

According to a second aspect of the present invention, the actuation member can move in the direction substantially crossing the direction in which the lock member moves, and hence the space required in the direction in which the lock member moves can be reduced.

According to a third aspect of the present invention, the actuation member can move in the same direction in which the lock member moves, and hence the space required in the direction which crosses the direction in which the lock member moves can be reduced.

What is claimed is:

1. A steering lock system, comprising:

an operation section of a key device;

an actuator section separated from the operation section for locking/unlocking a steering shaft according to an actuation of the operation section, the actuator section including:

a lock member moveable between a lock position where the lock member locks the steering shaft and an unlock position where the lock member unlocks the steering shaft, the lock member biased toward the lock position by a lock spring;

a release mechanism for moving the lock member to the unlock position;

an electric actuator for actuating the release mechanism;

an unlock-status hold member for engaging the lock member according to the actuation of the release mechanism to hold the lock member in the unlock position;

an electric unlocking member controlled according to the actuation of the operation section to move the unlock-status hold member in a disengage direction; and a disengage control member to prevent the unlock-status hold member from disengaging the lock member when the lock member is actuated to the unlock position and to allow disengagement of the unlock-status hold member when the lock member is actuated to the lock position.

2. The steering lock system according to claim 1, wherein the electric unlocking member includes a solenoid.

3. The steering lock system according to claim 1, wherein the electric actuator includes a motor and a gear system.

4. The steering lock system according to claim 1, wherein the unlock-status hold member is operated according to a topography of a surface on the release mechanism.

* * * * *